United States Patent [19]
Delle Cave

[11] Patent Number: 5,217,042
[45] Date of Patent: Jun. 8, 1993

[54] RESIDENTIAL WASTE WATER DISPOSAL SYSTEM

[76] Inventor: Steven F. Delle Cave, 120 7th St. N., Naples, Fla. 33940

[21] Appl. No.: 855,076

[22] Filed: Mar. 23, 1992

Related U.S. Application Data

[63] Continuation of Ser. No. 603,431, Oct. 26, 1990, Pat. No. 5,099,874.

[51] Int. Cl.$^5$ .............................................. E03F 3/04
[52] U.S. Cl. ...................................... 137/357; 137/594
[58] Field of Search ............... 137/594, 595, 357, 356, 137/597, 236; 285/132, 137.1

[56] References Cited

U.S. PATENT DOCUMENTS

| | | | |
|---|---|---|---|
| 1,211,262 | 1/1917 | Welsh | 285/132 X |
| 1,232,855 | 7/1917 | Schoonover | 285/132 |
| 1,582,529 | 4/1926 | Mueller | 137/594 X |
| 2,228,489 | 1/1941 | Schmidt | 137/594 X |
| 2,284,937 | 6/1942 | Wood | 285/132 |
| 2,439,712 | 4/1948 | Brady | 285/132 |
| 4,112,972 | 9/1978 | Lajeuness | 137/875 X |
| 5,054,818 | 10/1991 | Briet | 285/137.1 |

*Primary Examiner*—Stephen M. Hepperle
*Attorney, Agent, or Firm*—Merrill N. Johnson

[57] ABSTRACT

A waste water disposal system for a building which saves and recycles the grey waste water for lawn and plant irrigation. The system includes interconnected waste water pipes containing two separate passageways, one for reusable grey water and the other for sewer water, and three different types of T-fittings used with the two passageway waste water pipes, each T-fitting designed to interconnect two axially aligned waste water pipes and having an offset opening to one of the waste water passageways in the fitting, one type of T-fitting designed to discharge sewer water into the sewer water passageway in the fitting, the second type designed to discharge grey water into the grey water passageway of the fitting, and the third type designed to vent to the atmosphere both passageways in the fitting. The system also includes a fourth T-fitting designed to divert the reusable grey water flowing in one of the aforesaid two passageway pipes into a storage tank and also to channel the sewer water flowing in the other passageway of the pipe into a public sewer line or septic system.

2 Claims, 2 Drawing Sheets

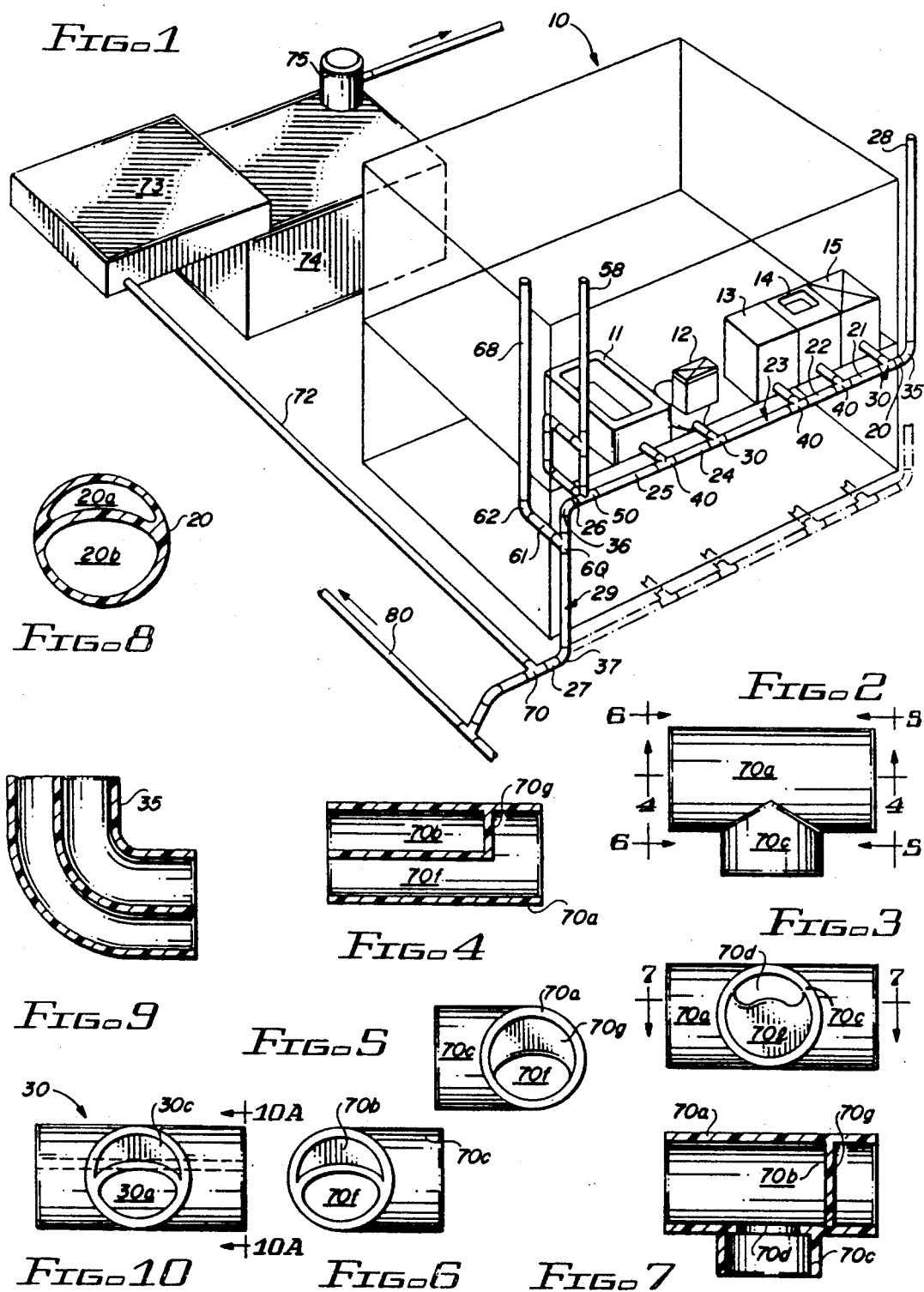

RESIDENTIAL WASTE WATER DISPOSAL SYSTEM

This application is a continuation of Ser. No. 07/603,431 filed Oct. 26, 1990, now U.S. Pat. No. 5,099,874.

BACKGROUND AND SUMMARY OF THE INVENTION

The invention lies in the field of systems for the disposal of waste waters generated within a building and more particularly to a waste water disposal system which saves and recycles for further use a portion of the building's waste water, thus conserving a sizable portion of the water usually used in the operation and maintenance of the building.

Most buildings, whether residential or commercial, contain a number of appliances which require fresh water and generate waste water which has to be drained off and disposed of in an approved and sanitary manner. Some appliances such as toilets and garbage disposals generate waste waters which must be drained off and disposed of in a public sewer or a septic system.

However, other appliances such as bathtubs, shower stalls, bathroom and kitchen sinks, and clothes washers generate waste waters commonly called grey water containing only small amounts of soap or detergent residues which can be safely reused to irrigate lawns and plants surrounding the building. Recycling of the grey water generated in the building would save the use of considerable fresh water normally used in the irrigation of the building's lawns and plants.

I have invented a waste water disposal system which permits the recapture and storage for irrigation or other reuse of the grey waste water generated in a building.

My water conserving waste water disposal system in operation drains the waste waters from all the appliances in the building into one common disposal line, but that line contains two parallel but separate passageways, one for the reusable grey water destined to be stored for reuse and the other passageway for the contaminated sewer water to be emptied into a public sewer line or a septic system.

In order to drain the waste water classified as reusable grey water into the grey water passageway of the common disposal line and also to drain the contaminated sewer water into the other passageway, I have developed two unique T-fittings which permit the discharge of waste water from an appliance into the proper passageway without interference with the flow of previously discharged waste water through the two passageways in the common line.

In order to maintain a continuous flow of waste water through the line, it is desirable to vent to the atmosphere both of the passageways in the line. To accomplish this, I have developed a third T-fitting which vents both passageways without danger of mixing together the two streams of waste water flowing in the two passageways.

Finally, I have developed a fourth T-fitting which diverts the flow of reusable grey water flowing in the common line into a storage tank for eventual irrigation or other reuse. This T-fitting also channels the flow of sewer water flowing in the other passageway into a public sewer line or into a septic tank.

Few buildings contain identical types and numbers of water using appliances, some of which generate reusable grey waste water while others generate waste water which must be emptied into a sewer line or a septic tank. However, the segregation, storage and reuse of grey water will save thousands of gallons of fresh water presently being used to irrigate the lawns and plants surrounding the building.

My pipes containing two passageways and the four unique T-fittings used in the construction of waste water disposal systems according to my invention are preferably made of polyvinyl chloride (PVC) or similar plastic material but may be made wholly or partially of metal or ceramic material.

The components of my water conserving waste water disposal system may be assembled in various combinations, with or without the addition of conventional pipes and fittings, depending upon the arrangement and relative positions of the waste water generating appliances in the building.

BRIEF DESCRIPTION OF THE DRAWINGS

FIG. 1 is a schematic view of a residential home piped to utilize my waste water disposal system;

FIG. 2 is a top plan view of one of the unique T-fittings used in the waste water disposal system shown in FIG. 1;

FIG. 3 is a front elevational view of the T-fitting shown in FIG. 2;

FIG. 4 is a cross-sectional front elevational view taken along line 4—4 of the T-fitting shown in FIG. 2;

FIG. 5 is a side elevational view taken along line 5—5 of the T-fitting shown in FIG. 2;

FIG. 6 is a side elevational view taken along line 6—6 of the T-fitting shown in FIG. 2;

FIG. 7 is a cross-sectional top plan view taken along line 7—7 of the T-fitting shown in FIGS. 2 and 3;

FIG. 8 is a cross-sectional end view of a waste water pipe containing two separate passageways used in the waste water disposal system shown in FIG. 1;

FIG. 9 is a cross-sectional side view of a waste water elbow fitting containing two passageways used in the waste water disposal system shown in FIG. 1;

FIG. 10 is a front elevational view of a unique T-fitting used to connect the drain of an appliance to the sewer water passageway of my waste water disposal system shown in FIG. 1;

DETAILED DESCRIPTION OF A PREFERRED EMBODIMENT

Figure 10A:
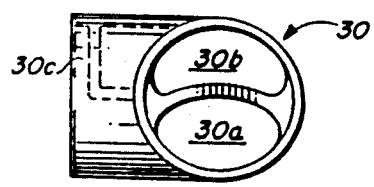
FIG. 10A is a side elevational view taken along line 10A—10A of the t-fitting shown in FIG. 10.

Referring to the drawings, FIG. 1 illustrates a residential home 10 containing a bathtub 11, a toilet 12, a clothes washer 13, a sink 14 and a garbage disposal 15, all five appliances generating waste water that has to be drained off and disposed of in an approved sanitary manner.

The waste waters from toilet 12 and garbage disposal 15 must be drained off into a public sewer system or a septic tank, but the waste waters from bathtub 11, clothes washer 13 and sink 14 containing only small amounts of soap and detergent residues (known as "grey water") can be safely used to irrigate lawns, trees, shrubs and flowers rather than flushed down the sewer with the waste water from toilets and garbage disposals.

FIG. 1 is a schematic illustration of a preferred embodiment of my waste water disposal system piped to dispose of waste waters from bathtub 11, toilet 12, washer 13, sink 14 and disposal 15. As shown in FIG. 1, all five appliances 11, 12, 13, 14 and 15 drain eventually into horizontal pipe segment 25. Pipe segment 25, like horizontal pipes 20, 21, 22, 23, 24, 26 and 27 and vertical pipes 28 and 29 contain two parallel but separate passageways.

FIG. 8 is a cross-sectional end view showing the two passageways in pipes 20-29. The small upper passageway 20a is for usable grey water and the larger lower passageway 20b is for sewer water. FIG. 9 is a cross-sectional side view of elbow fittings 35, 36 and 37 used with two passageway pipes as shown in FIG. 1.

The drains from toilet 12 and garbage disposal 15 are connected to the lower sewer water passageway 20b in pipe segments 24 and 21 respectively by use of T-fitting 30 shown in detail in FIGS. 10 and 10A. Waste water from toilet 12 or from disposal 15 flows easily into sewer water passageway 30a in T-fitting 30 while entry of sewer water into the upper grey water passageway 30b is blocked by wall 30c as shown in FIGS. 10 and 10A.

Figure 11:
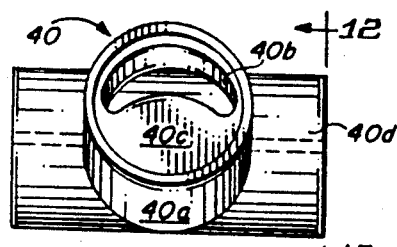
FIG. 11 is a front elevational view of another unique T-fitting used to connect the drain of an appliance to the grey water passageway of my waste water disposal system shown in FIG. 1.
Figure 12:
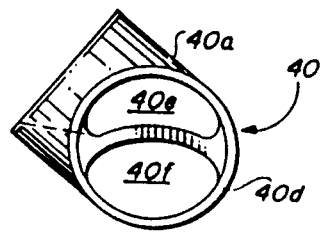
FIG. 12 is a side elevational view taken along line 12—12 of the T-fitting shown in FIG. 11.

The drains from bathtub 11, clothes washer 12 and sink 14 are connected to the upper grey water passageway 20a in pipe segments 25, 23 and 22 respectively by use of T-fitting 40 shown in detail in FIGS. 11 and 12. In order for waste water from tub 11, washer 12 and sink 14 to flow freely into the upper grey water passageway 20a of the pipe segments, T-fitting 40 includes arm 40a which connects into the fitting's main body 40d at an angle of 45° to horizontal as best shown in FIG. 12.

Because of the 45° downward tilt of arm 40a, waste water from, for example, tub 11 will flow into arm 40a and downwardly through passageway 40b into grey water passageway 40e, but because of wall 40c in the lower half of arm 40a, no grey water can flow into sewer water passageway 40f in the lower half of the fitting's main body 40d. Of course, sewer water from other appliances such as disposal 15 or toilet 12 can pass freely through sewer water passageway 40f.

In order to keep the waste water from the appliances flowing in one common direction (from right to left in the disposal system shown in FIG. 1) the generally horizontal pipe segments 20, 21, 22, 23, 24, 25, 26 and 27 must be tilted downwardly a few degrees and also the waste water passageways must be vented to the atmosphere.

The system shown in FIG. 1 contains three such vents, namely, vertical pipes 28, 58 and 68, the upper ends of which are all open to the atmosphere. The lower end of pipe 28 is fitted into elbow 35, thereby venting both the upper grey water passageway 20a and the lower and larger sewer water passageway 20b.

Figure 13:
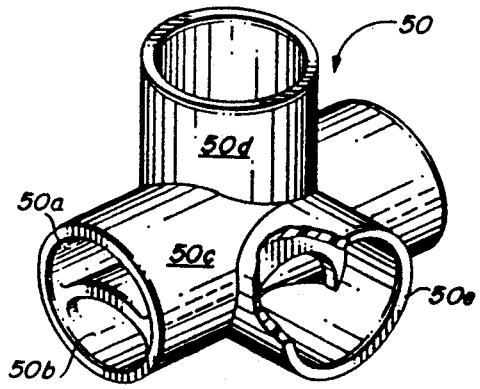
FIG. 13 is a detailed perspective view partially broken away showing the unique fitting used to vent to the atmosphere the passageways of my waste water disposal system shown in FIG. 1.

Pipe 58 is a conventional single passageway pipe which vents the lower end of the horizontal waste water passageways by means of unique T-fitting 50 shown in detail in FIG. 13. Fitting 50 includes a horizontal main body 50c containing an upper grey water passageway 50a and a separate sewer water passageway 50b as shown in FIG. 13. Fitting 50 also includes a hollow vertically projecting arm 50d which opens into upper passageway 50a and a hollow horizontally projecting arm 50e which opens into sewer passageway 50b. Both passageways 50a and 50b are vented into the lower end of pipe 58 by means of the conventional unnumbered pipes and elbows shown in FIG. 1.

Figure 14:
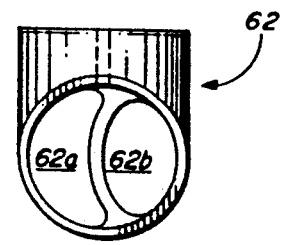
FIG. 14 is a front elevational view of another waste water elbow fitting containing two passageways used in the waste water disposal system shown in FIG. 1.
Figure 15:
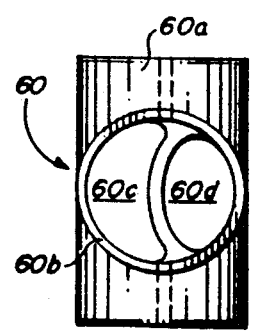
FIG. 15 is a front elevational view of another unique T-fitting used in venting to the atmosphere the two waste water passageways in my waste water disposal system shown in FIG. 1.

Pipe 68 is a conventional single passageway PVC pipe which vents the two vertical waste water passageways in pipe segment 29 by means of T-fitting 60 shown in detail in FIG. 15, a length of two passageway pipe 61, and a two passageway elbow fitting 62 shown in detail in FIG. 14. Fitting 60 includes a main body which contains two parallel but separate waste water passageways and at its midsection a horizontally projecting arm 60b containing two parallel but separate passageways 60c and 60d connecting with the two separate waste water passageways of main body 60a. Pipe 61 is connected to arm 60b so as to keep separate the grey and sewer waste waters flowing through the main body 60a of fitting 60 by tilting pipe 61 upwardly a few degrees from horizontal to where pipe 61 meets elbow fitting 62 which also contains two passageways 62a and 62b as shown in FIG. 14. Since the upper end of elbow fitting 62 is well above the level of fitting 60, there is no danger of mixing grey waste water and sewer water as these two wastes flow vertically from elbow fitting 36 down through pipe 29 while being vented to the atmosphere from pipe 68.

The two separated flows of grey water and sewer water thus continue side by side through elbow fitting 37 and pipe 27 until reaching T-fitting 70 where the grey water is channeled through conventional pipe 72 into a settling tank 73 and thence into storage tank 74 where the grey water is held for use in the irrigation of lawns, trees, shrubs, flowers and other uses through pump 75 as shown in FIG. 1.

In addition to channeling the grey water into a settling tank, fitting 70 channels the sewer water through conventional fittings into public sewer line 80 as shown in FIG. 1 or into a septic system.

The details of unique T-fitting 70 are shown in FIGS. 2, 3, 4, 5, 6 and 7. The fitting includes a main body 70a containing two parallel but separate passageways 70b and 70f. It also includes at the midsection of main body 70a an arm 70c projecting at right angle to the axis of the main body. Arm 70c contains an opening 70d which provides flow from the grey water passageway 70b in main body 70a into arm 70c, while a wall 70e best shown in FIG. 3 prevents the flow of sewer water into arm 70c. Wall 70g at the end of passageway 70b prevents the flow of grey water beyond opening 70d and helps direct the grey water to flow through opening 70d into arm 70c and on into pipe 72 and settling tank 73.

While I have described and illustrated a preferred embodiment of my water conserving waste water disposal system, my invention is in no way limited by such description or the accompanying drawings. Depending upon the arrangement of water using appliances within the building, various modifications and rearrangement of the components of my invention will be apparent to those skilled in the art. The scope and spirit of my invention is defined and limited only by the appended claims.

I claim:

1. A waste water fitting for use in a waste water piping system which includes a plurality of elongated waste water waste water pipes each having two parallel but separate passageways within the pipe, one passageway for the flow of reusable grey water and the other passageway for the flow of sewer water, the water in both passageways of each elongated waste water pipe flowing in the same direction, said fitting designed to interconnect the ends of two axially aligned elongated waste water pipes so as to keep the reusable grey water separate from the sewer water flowing through fittings and having a pair of offset arms each containing an opening into only one of the waste water passageways in the fitting so as to vent to the atmosphere the two passageways in the fitting.

2. A waste water fitting for use in a waste water piping system which includes a plurality of elongated waste water pipes each connected to a waste water pipe each having two parallel but separate passageways within the pipe, one passageway for the flow of reusable grey water and the other passageway for the flow of sewer water, the water in both passageways of each elongated waste water pipe flowing in the same direction, said fitting designed to connect two axially aligned elongated waste water pipes and divert all of the useable grey water flowing into said fitting from the waste water pipe conveying separate flows of grey water and sewer water and divert all the grey water into a single passageway pipe to be delivered to a storage tank and to deliver all of the sewer water flowing from said waste water fitting into a public sewer line or septic system.

* * * * *